United States Patent

Furuyama et al.

[11] Patent Number: 6,102,409
[45] Date of Patent: *Aug. 15, 2000

[54] SEALING DEVICE

[75] Inventors: Hideyuki Furuyama; Kaoru Anzue; Kouichi Mizunoya; Satoshi Yamanaka, all of Fukushima-ken, Japan

[73] Assignee: Nok Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/882,952

[22] Filed: Jun. 26, 1997

[30] Foreign Application Priority Data

Jun. 26, 1996 [JP] Japan .................................. 8-185483
Mar. 27, 1997 [JP] Japan .................................. 9-093185

[51] Int. Cl.[7] ...................................................... F16J 15/32
[52] U.S. Cl. ............................................ 277/562; 277/559
[58] Field of Search ................................... 277/562, 565, 277/559, 570, 576, 577

[56] References Cited

U.S. PATENT DOCUMENTS

| | | | |
|---|---|---|---|
| 4,310,163 | 1/1982 | Pippert | 277/562 |
| 4,623,153 | 11/1986 | Nagasawa | 277/562 X |
| 4,739,993 | 4/1988 | Steusloff et al. | |
| 5,055,015 | 10/1991 | Furukawa | 277/562 X |
| 5,106,565 | 4/1992 | Saitoh | 277/562 X |
| 5,509,666 | 4/1996 | Abraham et al. | 277/562 |
| 5,544,895 | 8/1996 | Heine et al. | 277/562 |
| 5,615,894 | 4/1997 | vom Schemm | 277/559 |
| 5,664,651 | 9/1997 | Miura et al. | 277/565 X |
| 5,690,471 | 11/1997 | Sasaki | 277/562 X |

FOREIGN PATENT DOCUMENTS

| | | | |
|---|---|---|---|
| 170928 | 2/1986 | European Pat. Off. | 277/559 |
| 404157264 | 5/1992 | Japan | 277/562 |
| 6-6831 | 1/1994 | Japan . | |
| 406129546 | 5/1994 | Japan | 277/562 |

*Primary Examiner*—Peter M. Cuomo
*Assistant Examiner*—Hanh V. Tran
*Attorney, Agent, or Firm*—Jacobson, Price, Holman & Stern, PLLC

[57] ABSTRACT

A sealing device including an annular support structure, a first annular sealing lip made of rubber and supported by the annular support structure, and a second annular sealing lip adjacent to the first annular sealing lip, the second annular sealing lip being made of resin and supported by the annular support structure. The first sealing lip made of rubber is located on the side to be sealed of the second sealing lip made of resin, and grease is held in a space formed by the first and second sealing lips and a shaft.

19 Claims, 5 Drawing Sheets

SEALING DEVICE

BACKGROUND OF THE INVENTION

1. Field of the Invention

The present invention relates to a sealing device to be used for sealing a shaft of, for example, a coolant circulating pump (water pump) in an automobile.

2. Background of the Prior Art

Heretofore, a mechanical seal has generally been used in a seal portion of a coolant water circulating pump in an automobile.

With the mechanical seal, however, various noises are generated during idling of the automobile because the seal portion is formed as a sliding surface.

Additionally, the mechanical seal causes an increase in the manufacturing cost because it includes many portions that are precision-machined.

SUMMARY OF THE INVENTION

It is an object of the present invention to provide a sealing device capable of preventing the generation of the aforesaid noises and capable of reducing manufacturing costs.

The sealing device of the present invention has a first sealing lip made of rubber and slidable with respect to a shaft and a second sealing lip made of resin slidable with respect to the said shaft, with a lubricant being held between the first and second sealing lips.

It is preferable that a spiral groove is formed in the first and/or the second sealing lip, whereby, during rotation of the shaft, the spiral groove if formed in the second sealing lip prevents fluid from flowing downward. When the shaft is at a standstill, the fluid leaks along the groove because the second sealing lip of a second seal is made of resin and therefore the shape of the groove remains intact. However, since the shaft is sealed by a first seal, the fluid is prevented from flowing out downwardly.

For the resin there is usually a flouring series inelastic resin employed such as Teflon, for example. For the rubber there is an elastic body used such as, for example, nitrile rubber, acrylic rubber, fluorine-contained rubber, silicone rubber.

Since the first sealing lip is made of a rubber and the second sealing lip is made of resin, the second sealing lip is more rigid than the first sealing lip. Therefore, the second sealing lip does not undergo any excessive deformation even at an elevated pressure. Thus, it is possible to improve the total pressure resistance.

If the first sealing lip is located on the side of the second sealing lip to be sealed, variations in pressure against the second sealing lip are diminished and the amount of coolant and any foreign matter flowing to the second sealing lip is decreased. As a result, it is possible to attain not only an improvement of the pressure resistance but also prevention of wear of both the second sealing lip and the shaft.

Furthermore, since a lubricant is held between the first and second sealing lips, the lubricant is fed effectively to the space between the front end portion of the first sealing lip and the sealing surface of the second sealing lip, such that it is possible to decrease the sliding resistance and improve the wear resistance, without generation of noise.

Since the first and second sealing lips are made of rubber and resin, respectively, and a lubricant is used, it is possible to reduce manufacturing costs without the need of going through the precision machining as found in the prior art.

If spiral concaves and convexes or grooves are formed on the sealing surface of the first sealing lip, the fluid which has entered the seal can be excluded to the side to be sealed under a screw pump action during rotation of the shaft, such that it is possible to enhance the sealability characteristics.

If the spiral concaves and convexes or grooves are formed on the sealing surface of the second sealing lip, the fluid which has entered the seal can be excluded to the side to be sealed under a screw pump action during rotation of the shaft, and therefore it is possible to enhance the sealability characteristics.

If the seal portion of the first sealing lip is made generally arcuate in cross section, an oil film formed between the seal portion and the shaft becomes thicker, whereby not only is the wear resistance improved but it is also possible to prolong the service life.

It is preferable that a textile cloth is provided on the sealing surface of the first sealing lip. In the case where the fluid to be sealed is coolant having a high content of water, it is difficult to hold a highly lubricative oil component on the sliding surface of the seal portion, resulting in a likelihood of deteriorated wear resistance. However, with the presence of a textile cloth and lubricant held in the gaps of the textile cloth, the sealing surface of the first sealing lip slides while forming a thin film of the lubricant. As a result, durability can be improved.

The textile cloth is impregnated with a rubber, then is fed into a mold and is bonded to the first sealing lip simultaneously with the vulcanization molding of the first sealing lip. The rubber is then present in a crosslinked state within the textile cloth.

By such a structure of the first sealing lip, the sealability of the sealing surface can be insured by the rubber, the strength of the sealing lip can be improved by the textile cloth, and the wear resistance can be improved by the lubricant held in the gaps of the textile cloth and the rubbery elastomer.

The term "rubber" is used herein in a broad sense covering various rubbery elastic types of bodies.

BRIEF DESCRIPTION OF THE DRAWINGS

The present invention will be described hereinunder with reference to the accompanying drawings, in which.

DESCRIPTION OF THE PREFERRED EMBODIMENTS

Embodiment 1

Figure 1:
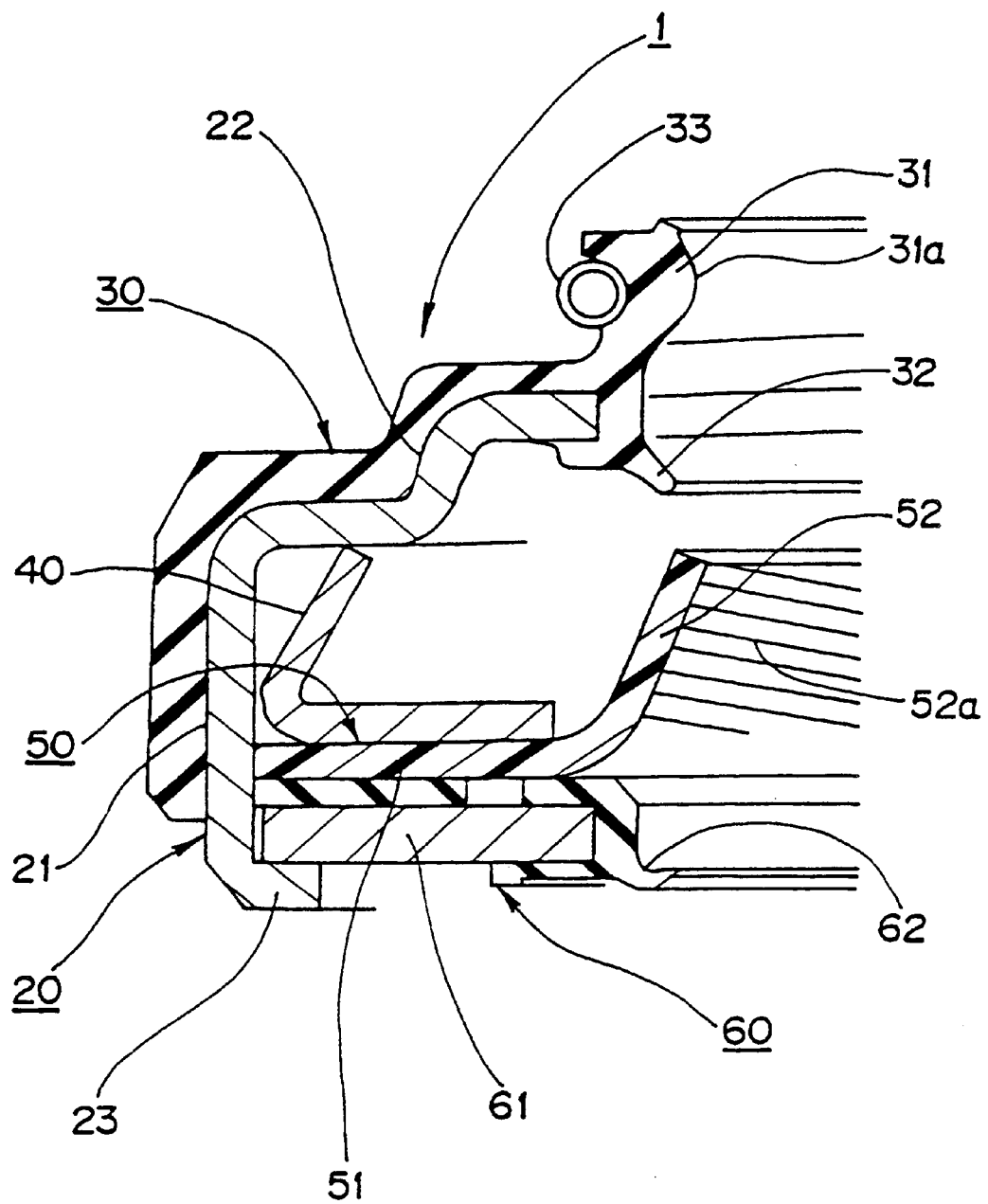
FIG. 1 is a sectional view showing a principal portion of a sealing device according to a first embodiment of the present invention.

FIG. 1 shows a sealing device generally indicated by the numeral 1 embodying the present invention.

The sealing device 1 has a first seal 30 integral with a cylindrical reinforcing ring 20, a seal holding member 40, a second seal 50, and a third seal 60.

The reinforcing ring 20, which is metallic, is provided with a stepped inward flange 22 on the side of a cylindrical portion 21 to be sealed. Also on the side opposite to the side to be sealed there is formed an inward flange 23. The outer periphery of the cylindrical portion 21 of the reinforcing ring 20, the outside surface of the inward flange 22, and the inner end portion of the inward flange 22 are covered with the first seal 30 which is preferably formed of rubber.

The inner end portion of the stepped inward flange 22 is formed with a first sealing lip 31 as an auxiliary sealing lip extending to the inner side to be sealed and is also formed with a sub lip 32 extending parallel with the first sealing lip 31.

In the illustrated embodiment, the first seal 30, the first sealing lip 31 and the sub lip 32 are constituted as an integral body.

Outside the first sealing lip 31 is mounted an annular spring 33 which urges the first sealing lip inward. By means of the spring 33 a front end portion 31a of the first sealing lip 31 is brought into slidable contact with the outer periphery of a shaft 3 at a predetermined pressure to exhibit a sealing function.

It is optional whether the sub lip 32 is to be contacted or not contacted with the outer periphery of the shaft 3. As will be described herein, the sub lip 32 functions to hold lubricant between the first sealing lip 31 and a second sealing lip 52.

An outer portion 51 of the second seal 50 and a third seal 60, which will be described herein, are fixed to the inner periphery of the reinforcing ring 20 in a caulked manner by means of the seal holding member 40, which is metallic and generally V-shaped in cross section, and the inward flange 23 of the reinforcing ring 20.

The second seal 50 is preferably formed of a fluorine series inelastic resin, such as PTFE, and the whole thereof is in a generally annular shape. The inner end portion of the second seal 50 is integrally formed with the second sealing lip 52 as a main sealing lip extending in the direction to be sealed. On a sealing surface 52a of the second sealing lip 52 are formed spiral concaves and convexes or grooves, whereby, during rotation of the shaft 3, a fluid which has entered the seal can be excluded to the side to be sealed under a screw pump action, thereby enhancing the sealability. The spiral concaves and convexes or grooves are not limited to such a multi-spiral shape as shown in FIG. 1, and even a single and continuous spiral will suffice. There is no limitation as long as it is possible to prevent downward flow and leak of grease 4 during rotation of the shaft 3.

The third seal 60 is a rubber like seal formed integrally to a metallic reinforcing ring 61 having a rectangular cross section. The third seal 60 covers the end face on the side to be sealed of the reinforcing ring 61 and an inner end portion thereof. At the inner end portion of the third seal 60 is formed a third sealing lip 62 extending inward. The third sealing lip functions to prevent the entry of dust. The front end of the third sealing lip 62 is not limited to such a shape as shown in FIG. 1 wherein the said front end is bent toward the side to be sealed. It may be bent to the side opposite to the side to be sealed.

Figure 2:
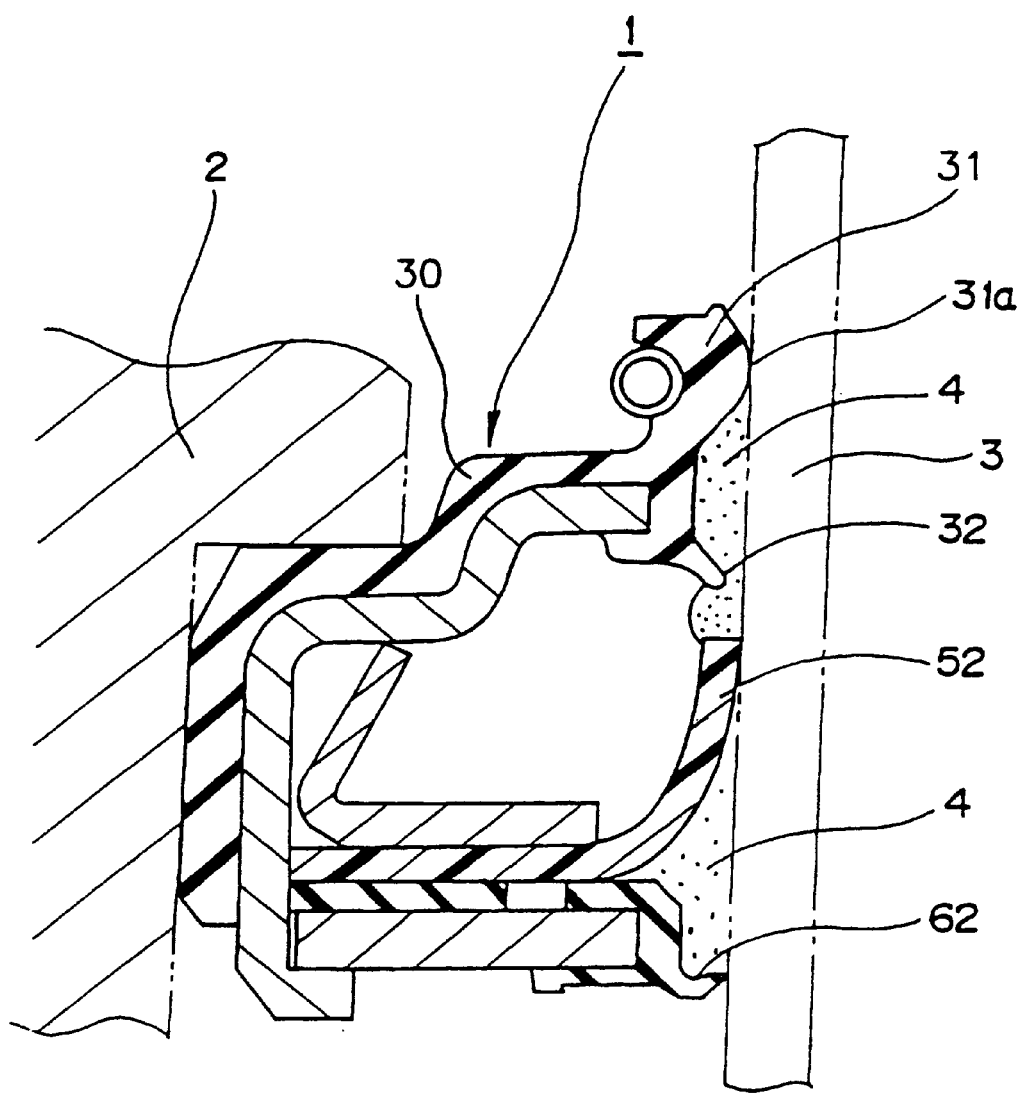
FIG. 2 is a sectional view of the sealing device of FIG. 1 as attached to a shaft of a water pump.

FIG. 2 illustrates the sealing device 1 of FIG. 1 as attached to the water pump shaft 3. An outer peripheral portion of the first seal 30 is fitted in the inner surface of a housing 2.

The space defined by the shaft 3, the front end portion 31a of the first sealing lip 31 and the sub lip 32, the space defined by the shaft 3, the sub lip 32 and the second sealing lip 52, and the space defined by the shaft 3, the second sealing lip 52 and the third sealing lip 62, are all filled with grease 4 as a lubricant.

The following description is now provided about the function of the sealing device illustrated in FIGS. 1 and 2.

The sealing device 1 includes a combination of the first sealing lip 31 made of rubber and the second sealing lip 52 made of resin (such as PTFE). The second sealing lip 52 mainly provides a sealing function. The first sealing lip 31 functions to temporarily prevent the entry of coolant and any foreign matter contained therein and also functions to hold grease between the first and second sealing lips 31, 52.

With the above construction, it is possible to attain reduction of manufacturing costs without the need for precision machining for components which has been required in the conventional mechanical seal.

The second sealing lip 52, made of PTFE, for example, is low in sliding resistance and possesses rigidity, such that even at an elevated pressure there is no possibility of seizure or deformation, and it is possible to improve the pressure resistance.

Moreover, since the first sealing lip 31 is disposed on the side of the second sealing lip 52 to be sealed, it is possible to diminish variations in pressure against the second sealing lip 52. Consequently, it is possible to improve the pressure resistance.

Further, extending the stepped inward flange 22 of the reinforcing ring 20 up to a position near the outer periphery of the shaft 3 as illustrated is advantageous in that even at an elevated pressure there is no possibility of easy deformation of the first seal 30 and it is possible to further improve the pressure resistance.

The space defined by the shaft 3 and the first and second sealing lips 31 and 52, and the space defined by the shaft 3 and the second and third sealing lips 52 and 62, are filled with grease 4, and the grease 4 is fed effectively to the front end portion 31a of the first sealing lip 31 and also to the sealing surface 52a of the second sealing lip 52. Therefore, it is possible to decrease the sliding resistance and improve the wear resistance, with no generation of noises such as mechanical noise.

Constructing the second sealing lip 52 with a resin such as PTFE is advantageous over the use of rubber because there are attained improvements in both wear resistance and resistance to chemicals.

As mentioned above, moreover, since the amount of coolant and any foreign matter contained therein that reaches the second sealing lip 52 is decreased by the first sealing lip 31 made of rubber, it is possible to prevent wear of the second sealing lip 52 and that of the shaft 3.

By forming the front end portion 31a of the first sealing lip 31 in an arcuate shape in cross section, the contact pressure of the front end portion 31a decreases and the thickness of an oil film formed between the front end portion 31a and the shaft 3 becomes thicker, so that not only is it possible to improve the wear resistance but also the service life of the sealing lip can be prolonged.

Since the entry of dust or the like and the lead of grease 4 can be prevented by the third sealing lip 62, it is possible to prevent damage and wear of the second sealing lip 52 and improve the sealing function.

Although the above description is directed to the case where the sealing device embodying the present invention is applied to the shaft 3 of a water pump, the invention is not limited thereto.

Embodiment 2

Figure 3:
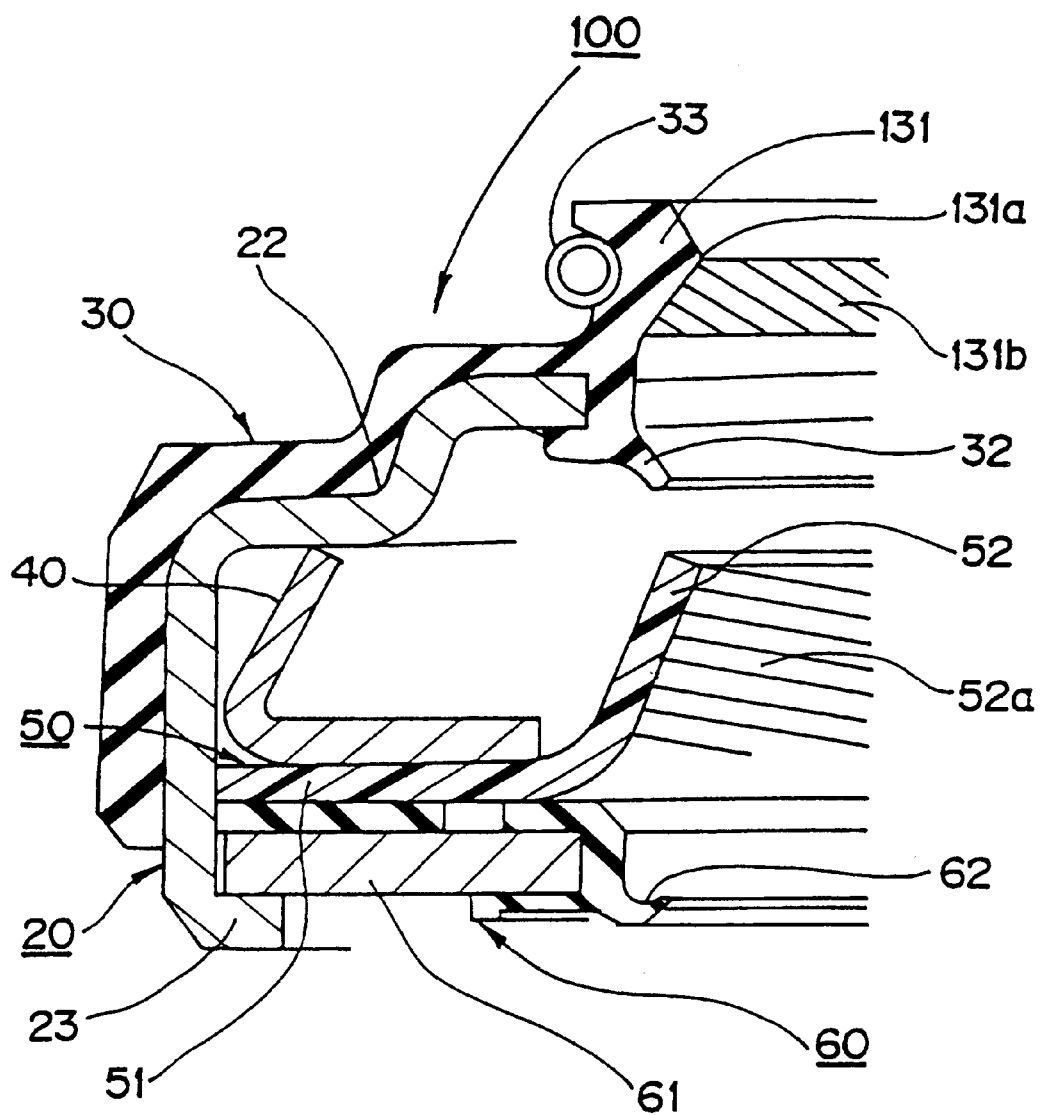
FIG. 3 is a sectional view showing a principal portion of a sealing device according to a second embodiment of the present invention.

FIG. 3 illustrates a sealing device 100 according to the second embodiment of the present invention.

Since the same portions as in the first embodiment are indicated by the same reference numerals as in the first embodiment, explanations thereof are here omitted.

The sealing device 100 of the second embodiment uses a first sealing lip different from that used in the sealing device 1 of the first embodiment.

The first sealing lip, indicated at 131, used in the sealing device 100 has a sharp front end portion 131a, with spiral concaves and convexes or grooves being formed on a sealing surface 131b, whereby, during rotation of the shaft 3, any fluid which has entered the body of the sealing device 100 is discharged to the exterior of the body by virtue of the screw pump action. Thus, it is impossible to further improve the sealing performance of the device.

The spiral concaves and convexes or grooves are not limited to such a multi-spiral shape as shown in FIG. 3, and even a single and continuous spiral will suffice.

Embodiment 3

Figure 4:
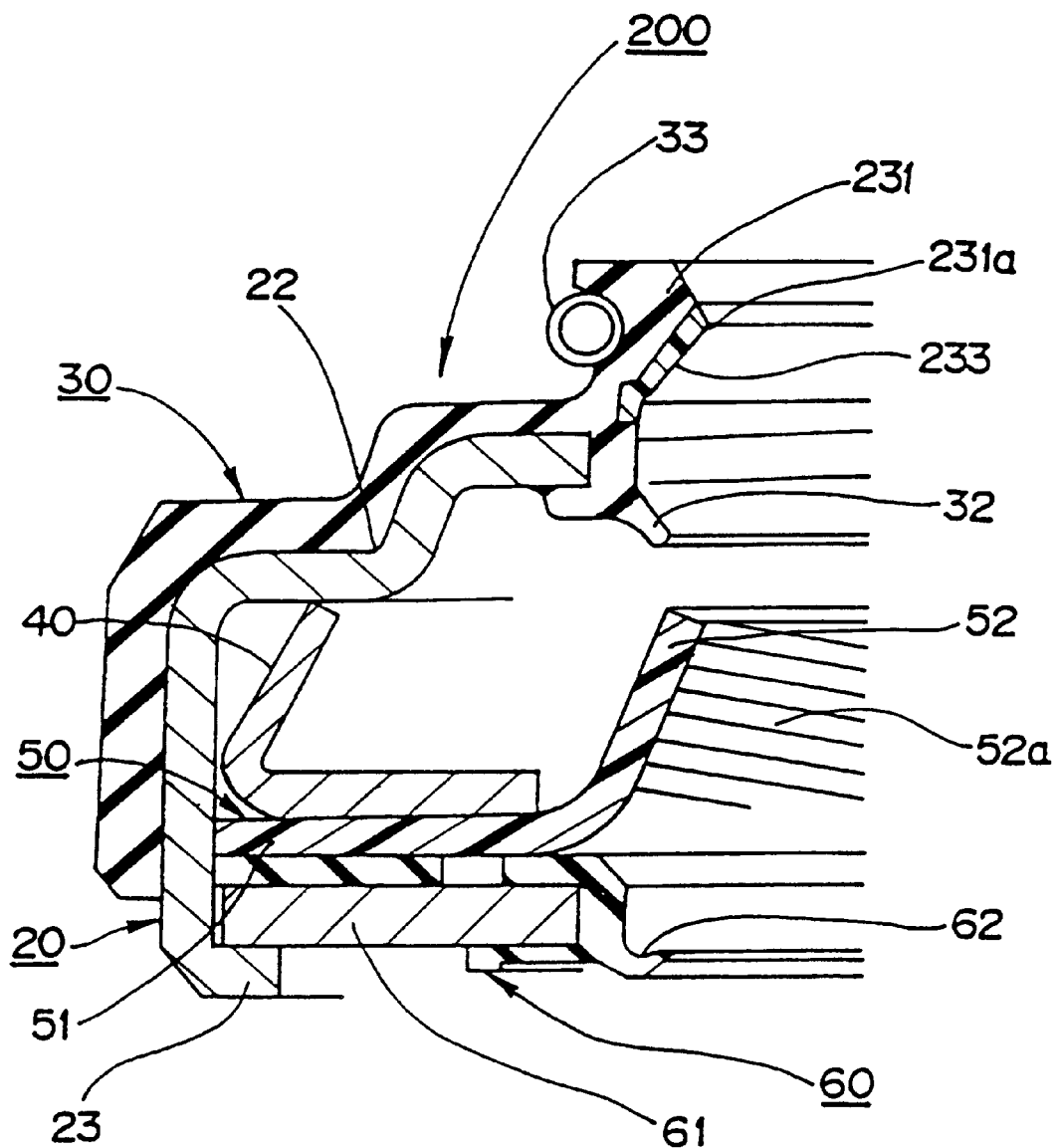
FIG. 4 is a sectional view showing a principal portion of a sealing device according to a third embodiment of the present invention.

FIG. 4 illustrates a sealing device 200 according to a third embodiment of the present invention.

The same portions as in the first embodimment are indicated by the same reference numerals and explanations thereof are omitted here.

The sealing device 200 of this third embodiment uses a first sealing lip different from that used in the sealing device 1 of the first embodiment.

The first sealing lip, indicated at 231, of the sealing device 200 has a sharp front end portion 231a, and a reinforcing member 233 formed of an inelastic resin, such as PTFE, is formed to the sealing surface of the first sealing lip, whereby it is possible to improve the wear resistance of the first sealing lip 231.

Embodiment 4

Figure 5:
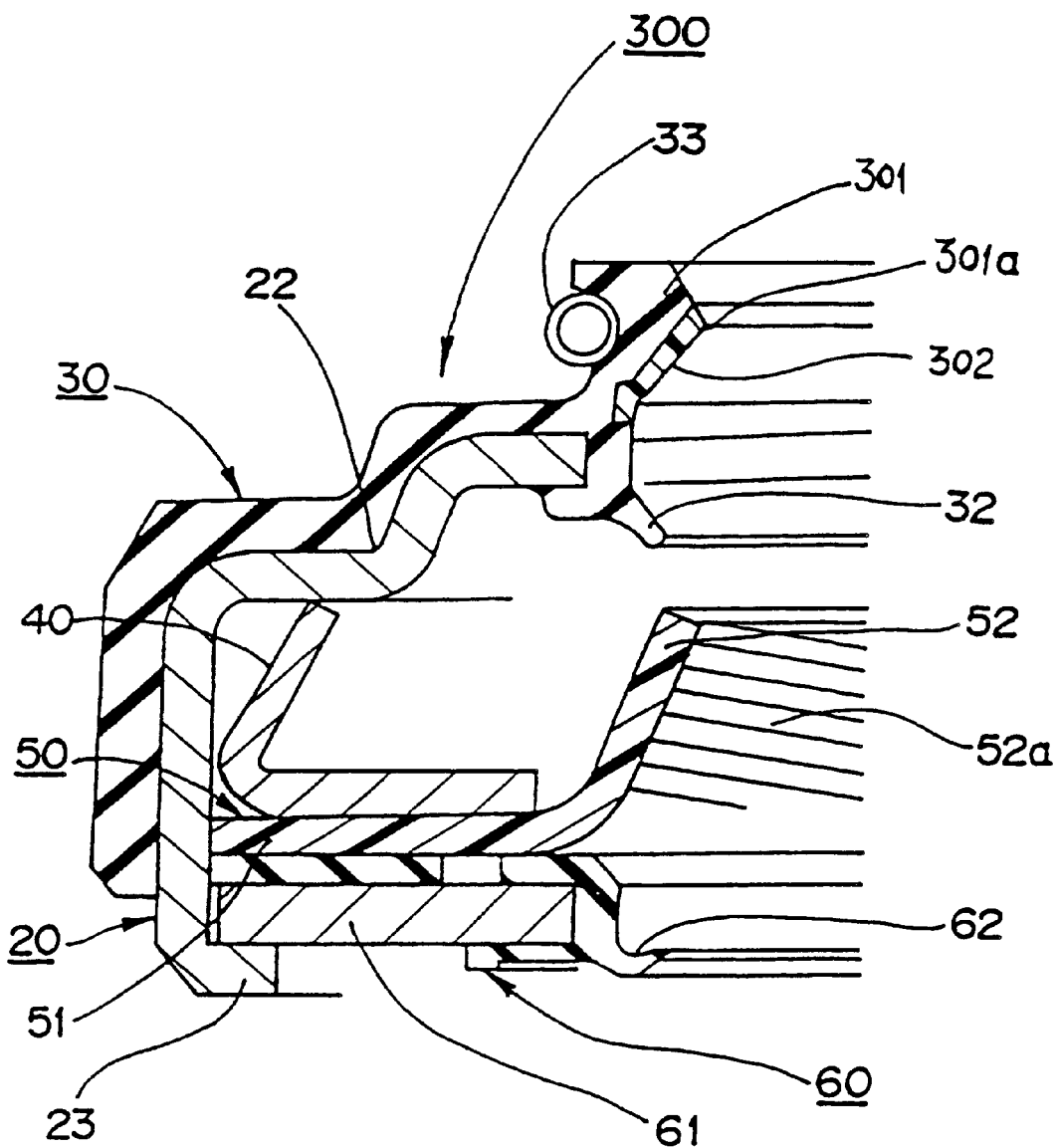
FIG. 5 is a sectional view showing a principal portion of a sealing device according to a fourth embodiment of the present invention.

FIG. 5 illustrates a sealing device 300 according to the fourth preferred embodiment of the present invention.

The same portions as in the first embodiment are indicated by the same reference numerals and explanations thereof are omitted here.

The sealing device 300 permits a more positive lubrication of grease 4 between a sliding surface of a first sealing lip 301 and that of the shaft 3 which is in opposed abutment with the sliding surface of the first sealing lip. Even in the case where the fluid to be sealed is one containing water, such as coolant for example, it is possible to prevent breaking of an oil film at the lip front end portion and improve durability.

In the sealing device 300, a textile cloth 302 is bonded to the sealing surface on the grease holding side of the first sealing lip 301.

For the textile cloth 302, there may be used a so-called nonwoven cloth or a fabric obtained by using strong fibers. The textile cloth is applied impregnated with a petroleum solvent solution, such as rubber cement, which contains several percentages of a rubber component and which is utilized for bonding rubber. Alternatively, a powdery rubber component is deposited on the textile cloth. Thereafter, the textile cloth is placed in a mold for molding the first sealing lip 301 and is bonded to the first sealing lip simultaneously with the vulcanization molding of the same sealing lip, to form the structure shown in FIG. 5. Rubber is, therefore, present in a crosslinked state in the interior of the textile cloth.

The textile cloth 302, by the action of the rubber present in the interior thereof, exhibits a sealability of its sealing surface to the same extent as that of the sealing surface not provided with the textile cloth.

Furthermore, there can be attained improvement of strength by the textile cloth and improvement of wear resistance by the lubricant held in the gaps of the textile cloth and rubber.

Also in this fourth embodiment, as in the first embodiment illustrated in FIG. 2, the grease 4 is sealed in the space defined by the shaft 3 and the first and second sealing lips 301 and 52 and in the space defined by the shaft 3 and the second and third sealing lips 52 and 62, and the grease is fed to and held at a front end portion 301a of the first sealing lip at the front end portion of the textile cloth 302 and between the sealing surface 52a of the second sealing lip 52 and the shaft 3.

In the present invention, a first sealing lip made of rubber and a second sealing lip made of resin are combined slidably with respect to a shaft of a water pump, for example. Thus, the second sealing lip is more rigid than the first sealing lip, so even at an elevated pressure there is no danger of deformation and it is possible to improve the pressure resistance.

Since the first sealing lip is provided on the side of the second sealing lip to be sealed, not only variations in pressure against the first sealing lip are diminished but also the amount of coolant and any foreign matter reaching the second sealing lip is reduced. Thus, it is possible to attain both an improvement of the pressure resistance and a prevention of wear of the second sealing lip and the shaft.

Furthermore, with a lubricant held between the first and second sealing lips, the lubricant is fed effectively between the front end portion of the first sealing lip and the sealing surface of the second sealing lip, whereby the sliding resistance can be diminished and the wear resistance can be improved, with no generation of noise such as mechanical noise.

Because the second sealing lip is made of resin, the first sealing lip is made of rubber, and lubricant is held between the first and second sealing lips, precision machining as in the prior art is not required, and it is possible to reduce manufacturing costs.

Since spiral concaves and convexes or grooves are formed on the sealing surface of at least one of the first or second sealing lips, fluid can be excluded to the side to be sealed by the action of a screw pump during rotation of the shaft. Therefore, the sealability can be enhanced.

By forming the seal portion of the first sealing lip generally in an arcuate shape in cross section, the thickness of an oil film formed between the seal portion and the shaft becomes larger, so that not only can the wear resistance be improved but it is also possible to prolong the service life.

With a textile cloth provided on the sealing surface of the first sealing lip, lubricant is held in the small gaps of the textile cloth, and the sealing surface of the first sealing lip slides while forming a thin film of the lubricant, improving durability.

Furthermore, when rubber or such is present in a crosslinked state within the textile cloth, the sealability of the sealing surface can be kept high by the rubber material, the strength of the sealing lip can be improved by the textile cloth, and wear resistance can be improved by the lubricant held in the gaps of the textile cloth and rubber.

What is claimed is:

1. A sealing device comprising:

a shaft;

a first sealing lip made of rubber, said first sealing lip being slidable with respect to said shaft;

a second sealing lip made of resin located adjacent to said first sealing lip, said second sealing lip being slidable with respect to said shaft;

a lubricant held in a space between said first and second sealing lips;

said second sealing lip having a sealing surface formed with spiral concaves and convexes for urging movement of lubricant in a direction opposite to the atmosphere whereby any fluid which enters between said second sealing lip and said shaft can be excluded to said space under a screw pump action during rotation of said shaft.

2. A sealing device according to claim 1, wherein said first sealing lip has a sealing surface formed with spiral concaves and convexes.

3. A sealing device according to claim 1, wherein said first sealing lip has a sub sealing lip adjacent to said second sealing lip.

4. A sealing device according to claim 1, wherein said first sealing lip has a sealing surface including a textile cloth.

5. A sealing device according to claim 4, wherein rubber is present in a crosslinked state within said textile cloth.

6. A sealing device according to claim 5, wherein said textile cloth is impregnated with the rubber, and is bonded to said first sealing lip in a mold simultaneously with vulcanization molding of said first sealing lip in said mold.

7. A sealing device according to claim 1, wherein said first sealing lip has a sealing surface which has a sharp end.

8. A sealing device as defined in claim 1, further comprising:
a third sealing lip made of rubber located adjacent to said second sealing lip, said third sealing lip being slidable with respect to said shaft; and
a lubricant held in a space between said second and third sealing lips.

9. A sealing device according to claim 1, wherein the first sealing lip has a front end portion formed in an arcuate shape in cross section so that a required contact pressure of the front end portion against the shaft is decreased and a thickness of an oil film formed between the front end portion and the shaft is increased.

10. A sealing device comprising:
an annular support structure;
a first sealing lip made of rubber, said first sealing lip being supported by said annular support structure;
a second sealing lip located adjacent to said first sealing lip, said second sealing lip being made of resin and supported by said annular support structure;
a space for holding a lubricant between said first and second sealing lips;
said second sealing lip having a sealing surface formed with spiral concaves and convexes for urging movement of lubricant in a direction opposite to the atmosphere whereby any fluid which enters between said second sealing lip and said shaft can be excluded to said space under a screw pump action during rotation of said shaft.

11. A sealing device according to claim 10, wherein said first sealing lip has an annular front end portion and a sub lip extending in parallel with said front end portion and said sealing lip is adapted for a lubricant to be held between said front end portion and said sub lip when the sealing device is attached to a shaft.

12. A sealing device according to claim 10, wherein said first sealing lip has a sealing surface formed with spiral concaves and convexes.

13. A sealing device according to claim 10, wherein said front end portion of said first sealing lip is located adjacent to a spring for urging the first sealing lip radially inwardly.

14. A sealing device according to claim 10, wherein said first sealing lip has a sealing surface provided with a textile cloth.

15. A sealing device according to claim 14, wherein rubber is present in a crosslinked state within said textile cloth.

16. A sealing device according to claim 15, wherein said textile cloth is impregnated with the rubber and is bonded to said first sealing lip in a mold simultaneously with vulcanization molding of the first sealing lip in said mold.

17. A sealing device according to claim 10, wherein said first sealing lip has a sealing surface which includes a sharp end.

18. A sealing device as defined in claim 10, further comprising:
a third sealing lip made of rubber located adjacent to said second sealing lip; and
a space for holding a lubricant between said second and third sealing lips.

19. A sealing device according to claim 10, wherein the first sealing lip has a front end portion formed in an arcuate shape in cross section so that a required contact pressure of the front end portion against the shaft is decreased and a thickness of an oil film formed between the front end portion and the shaft is increased.

* * * * *